United States Patent
Galbraith et al.

(10) Patent No.: US 12,461,871 B2
(45) Date of Patent: Nov. 4, 2025

(54) DEVICE CONTROL BLOCK SCAN FOR CHANNEL RECOVERY ACTIONS

(71) Applicant: International Business Machines Corporation, Armonk, NY (US)

(72) Inventors: Robert Edward Galbraith, Rochester, MN (US); Martin Taubert, Gaertringen (DE); Jana Christine Migge, Aidlingen (DE); Francis Gassert, Monroe, NY (US)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 18/358,730

(22) Filed: Jul. 25, 2023

(65) Prior Publication Data

US 2025/0036586 A1 Jan. 30, 2025

(51) Int. Cl.
*G06F 13/20* (2006.01)

(52) U.S. Cl.
CPC .......... *G06F 13/20* (2013.01); *G06F 2213/40* (2013.01)

(58) Field of Classification Search
CPC .............................. G06F 9/45537; G06F 13/12
See application file for complete search history.

(56) References Cited

U.S. PATENT DOCUMENTS

| | | | |
|---|---|---|---|
| 5,812,820 A * | 9/1998 | Loram ................ | G06F 9/45537 703/20 |
| 7,774,519 B2 | 8/2010 | Casper et al. | |
| 2004/0230706 A1 * | 11/2004 | Carlson ................ | H04L 1/0073 710/1 |
| 2006/0282564 A1 * | 12/2006 | Casper .................... | G06F 13/12 710/39 |
| 2008/0126639 A1 * | 5/2008 | Oakes .................... | G06F 9/5016 710/111 |
| 2021/0216401 A1 * | 7/2021 | Meaney .............. | G06F 9/30047 |

FOREIGN PATENT DOCUMENTS

EP 0013739 B1 12/1983

* cited by examiner

*Primary Examiner* — Getente A Yimer
(74) *Attorney, Agent, or Firm* — Patterson + Sheridan, LLP

(57) ABSTRACT

Embodiments of the present disclosure provide systems and methods for implementing enhanced Device Control Block (DCB) scan recovery for channel recovery actions. A disclosed method comprises identifying channels to be recovered and creating a DCB bit array reflecting each DCB to be scanned for the set of the channels to be recovered by a system assist processor. The system assist processor performs asynchronous channel communication area (CCA) recovery processing, starts synchronous DCB scan recovery, and sequentially processes an incremental portion of the DCB bit array interleaved with asynchronous CCA recovery processing. The system assist processor completes asynchronous CCA recovery processing and synchronous DCB scan recovery to complete channel recovery of the set of channels. The system assist processor starts each channel of the set of channels responsive to completing channel recovery processing for each channel.

17 Claims, 6 Drawing Sheets

410 ⟶

DCB Bit Array 216 (per SAP 206 )
<numCSSID * numSSID * numIID * numDCBs#>

Example Size of DCB Bit Array 216 in HSA:212
- numCSSID = 6
- numSSID = 4
- numIID= 16
- numDCBs# = 64K 6 * 4 * 16 * 64K bits = 24Mb = 3MB
Number of DCB Bit Arrays = (number of SAPs * 3MB) = 64 * 3MB = 192MB

FIG. 4B

DEVICE CONTROL BLOCK SCAN FOR CHANNEL RECOVERY ACTIONS

BACKGROUND

The present invention relates to digital data processing, and more specifically, to systems and methods for implementing enhanced Device Control Block (DCB) scan for channel recovery actions in a channel subsystem (CSS).

Channel recovery is periodically required for example to recover and reset one or more channels in a channel subsystem (CSS) or Input/Output (I/O) subsystem of a multiple processor computer system. A channel commonly represents a port on an I/O adapter, such as a fibre channel or Ethernet adapter port. A CSS can include a large number of channels and multiple System Assist Processors (SAPs), also called Input/Output processors (IOPs), and associated with the channels. Currently channel recovery may be required for all the channels with each channel including a large number of Device Control Blocks (DCBs). Conventional channel recovery, which includes performing asynchronous channel recovery operations and synchronous DCB scan operations, often requires significant time to complete. The asynchronous channel recovery operations include processing a sequence of commands with a channel, performed for each of the channels to be recovered. Typically, the synchronous DCB scan operations for each channel are performed for the DCBs following completion of the asynchronous channel recovery operations for the respective channel. In the synchronous DCB scan recovery operations, DCBs are locked, fetched into a working copy, and synchronously scanned to check whether the DCB was affected by the recovery, where conventional DCB scan operations can significantly extend overall required time for channel recovery. New techniques are needed to provide effective and efficient channel recovery in an acceptable amount of time, avoiding possible extended recovery time of conventional arrangements.

SUMMARY

Embodiments of the present disclosure provide systems and methods for implementing enhanced Device Control Block (DCB) scan recovery for channel recovery actions.

A non-limiting disclosed computer implemented method comprises identifying channels to be recovered and creating a Device Control Block (DCB) Bit Array reflecting each DCB to be scanned for the set of the channels to be recovered by a system assist processor. The system applies the DCB Bit Array to the system assist processor to process channel recovery to reset and start the set of the channels. The system assist processor performs asynchronous channel communication area (CCA) recovery processing, starts synchronous DCB scan recovery, and sequentially processes an incremental portion of the DCB Bit Array interleaved with asynchronous CCA recovery processing. The system assist processor completes asynchronous CCA recovery processing and synchronous DCB scan recovery to complete channel recovery processing of the set of channels. The system assist processor starts each channel of the set of channels responsive to completing channel recovery processing for each channel.

Other disclosed embodiments include a computer control system and computer program product for implementing enhanced DCB scan recovery for channel recovery actions, implementing features of the above-disclosed method.

BRIEF DESCRIPTION OF THE DRAWINGS

FIGS. 4A and 4B illustrate operations for building an example DCB Bit Array per SAP and an example DCB Bit Array of one or more embodiments of the present disclosure.

DETAILED DESCRIPTION

Figure 1:
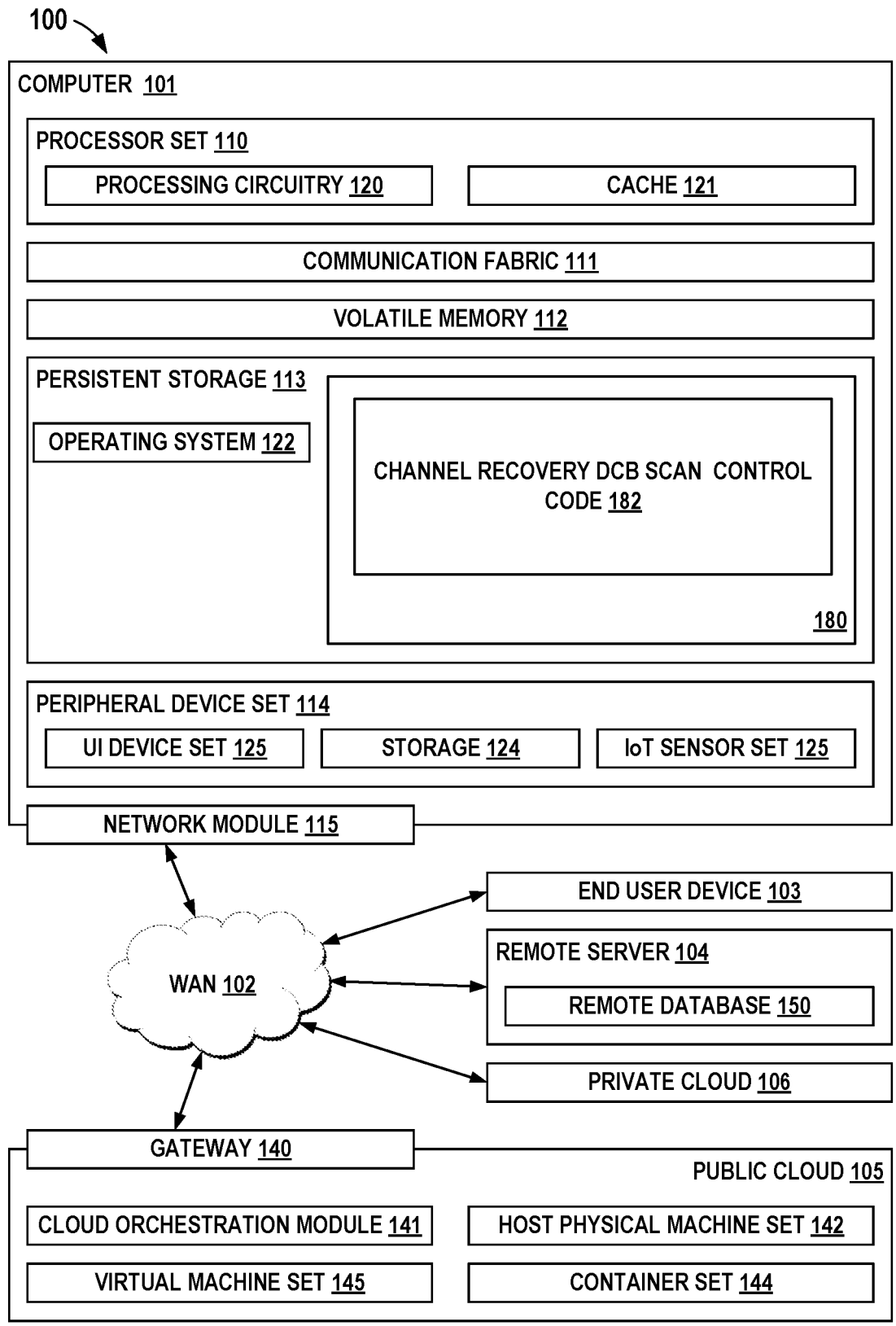
FIG. 1 is a block diagram of an example computer environment for use in conjunction with one or more disclosed embodiments for implementing Device Control Block (DCB) scan recovery for channel recovery actions.

An overall required time for channel recovery presents a problem for conventional channel recovery processing. For example, conventional synchronous DCB scan operations for each channel are performed for the DCBs following completion of the asynchronous channel recovery operations for the respective channel and can significantly extend overall required time for channel recovery. Embodiments of the present disclosure provide systems and methods for implementing enhanced DCB scan recovery for channel recovery actions. Disclosed embodiments provide an enhanced DCB scan by creating an DCB Bit Array and performing the DCB Scan interleaved with CCA processing. In accordance with a disclosed embodiment, the creation of the DCB Bit Array allows for scanning of all affected DCBs in various size increments and interleaved with asynchronous recovery operations. In a disclosed embodiment, at the beginning of channel recovery, an DCB Bit Array is built using a channel identifier (CHID) lookup table (LUT). Time slicing the asynchronous recovery operations and the DCB Scan synchronous recovery operations enable reduced overall recovery time. In a disclosed embodiment, the time slicing synchronous and asynchronous recovery actions allow performing more parallel recovery actions without an adverse change in the overall recovery time.

In accordance with a disclosed embodiment, performing an initial check to identify an idle status of any DCBs enables enhanced speed of the DCB scan synchronous recovery operations, where an identified idle status enables DCB scan operation without locking and fetching of idle DCBs, for example, the DCBs are examined directly in a hardware system area (HSA).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, a computing environment 100 contains an example of an environment for the execution of at least some of the computer code involved in performing the inventive methods, such as a Channel Recovery DCB Scan Control Code 182, at block 180. In addition to block 180, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 180, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 180 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 180 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Embodiments of the present disclosure provide systems and methods for implementing enhanced Device Control Block (DCB) scan recovery for channel recovery actions in a channel subsystem (CSS). The CSS of the present disclosure includes a large number of channels and multiple System Assist Processors (SAPs) associated with the channels. In a disclosed embodiment, channel recovery is enabled for individual channels and any subset or combination of the channels to be recovered at a time, which includes performing time slicing of asynchronous channel recovery operations and synchronous DCB scan recovery operations. In a disclosed embodiment, channel recovery includes enhanced DCB scan recovery of a set of channels to be recovered by a system assist processor. In a disclosed embodiment, channel recovery begins with identifying the channels to be recovered, and for a set of the channels to be recovered by a system assist processor (SAP), creating a Device Control Block (DCB) Bit Array for all the DCBs of the set of channels. A given system assist processor receives the DCB Bit Array for channel recovery of the set of the channels. The system assist processor prepares for channel recovery processing, starts asynchronous channel recovery operations, which include processing a sequence of channel communication area (CCA) commands for channel recovery, performed for each of the channels to be recovered by the system assist processor. The system assist processor initiates synchronous DCB scan recovery operations for each channel without waiting for the asynchronous channel recovery operations for the respective channel to complete. In a disclosed embodiment, the system assist processor enables sequentially processing an incremental portion of the DCB bit array, interleaved with asynchronous CCA recovery processing, in the synchronous DCB scan recovery operations. In a disclosed embodiment, for example, the synchronous DCB scan recovery operations replace an existing empty or delay time space during the asynchronous CCA recovery processing, for example, with DCB scan recovery operations of a defined size increment of the DCB bit array, such as scanning 1000 DCBs.

Figure 2:
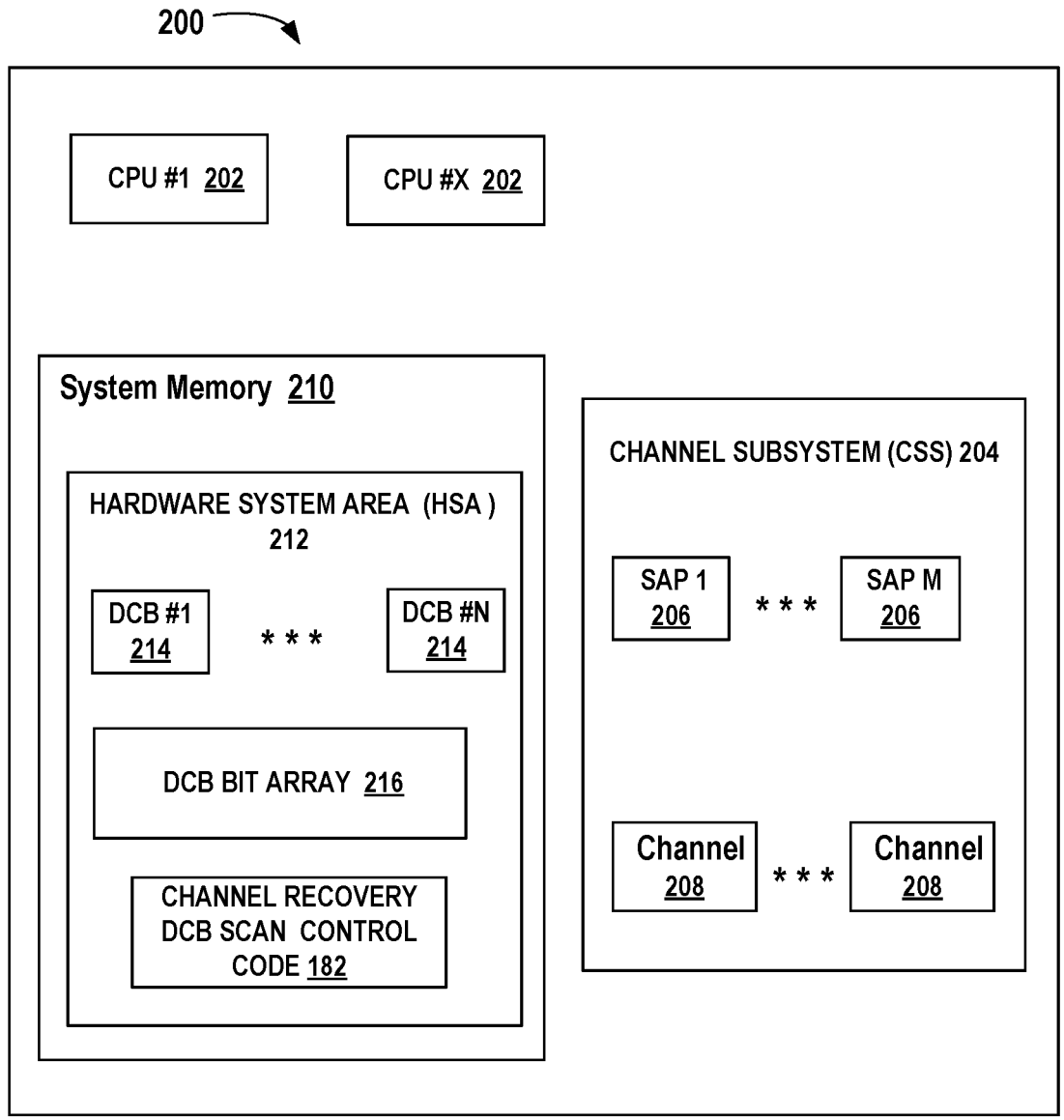
FIG. 2 is a block diagram of an example system for implementing enhanced DCB scan recovery for channel recovery actions of one or more embodiments of the present disclosure.

FIG. 2 illustrates an example system 200 for implementing enhanced DCB scan for channel recovery actions of disclosed embodiments. System 200 can be used in conjunction with the computer 101 and cloud environment of the computing environment 100 of FIG. 1 with the Channel Recovery DCB Scan Control Code 182 for implementing methods of the present disclosure.

System 200 includes multiple processors or central processor units (CPUs) 1-X 202, a channel subsystem (CSS) 204 or I/O subsystem including a plurality of System Assist Processors (SAPs) 1-M 206 to process channel recovery and a plurality of channels 208. The SAPs 1-M 206 are associated with the plurality of channels 208. For example, a particular SAP 206 performs certain types of work related to a channel 208. Each of the channels 208 represents a port of an input/output (I/O) adapter for example, an Ethernet adapter port Fibre Channel Connection (FICON) or Fibre Channel adapter port, not shown.

In a disclosed embodiment, system 200 performs channel recovery including enhanced DCB scan recovery of a set of channels 208 to be recovered by a system assist processor 206. In a disclosed embodiment, system 200 begins channel recovery with identifying the channels to be recovered, and for a set of the channels to be recovered by a given SAP 206, creates a DCB Bit Array 216 for all the DCBs 214 of the set of channels to be recovered.

System 200 includes a system memory 210 including a HSA 212 of disclosed embodiments. HSA 212 includes a plurality of DCBs 214, for example, thousands of DCBs per channel, such as 64K DCBs per channel. In one embodiment, HSA 212 includes a DCB Bit Array 216 per SAP 206. For example with 64 SAPs, HSA 212 includes 64 DCB bit arrays 216.

In a disclosed embodiment, system 200 implements a method of time slicing asynchronous recovery operations and synchronous DCB scan recovery operations to shorten an overall channel recovery time. For example, the system assist processor 206 starts synchronous DCB scan recovery, sequentially processing an incremental portion of the DCB Bit Array 216 interleaved with asynchronous CCA recovery processing. In a disclosed embodiment, system 200 implements a method of time slicing asynchronous recovery operations and synchronous DCB scan recovery operations to allow more parallel recovery actions to be performed without any substantial change to the overall recovery time.

Figure 3:
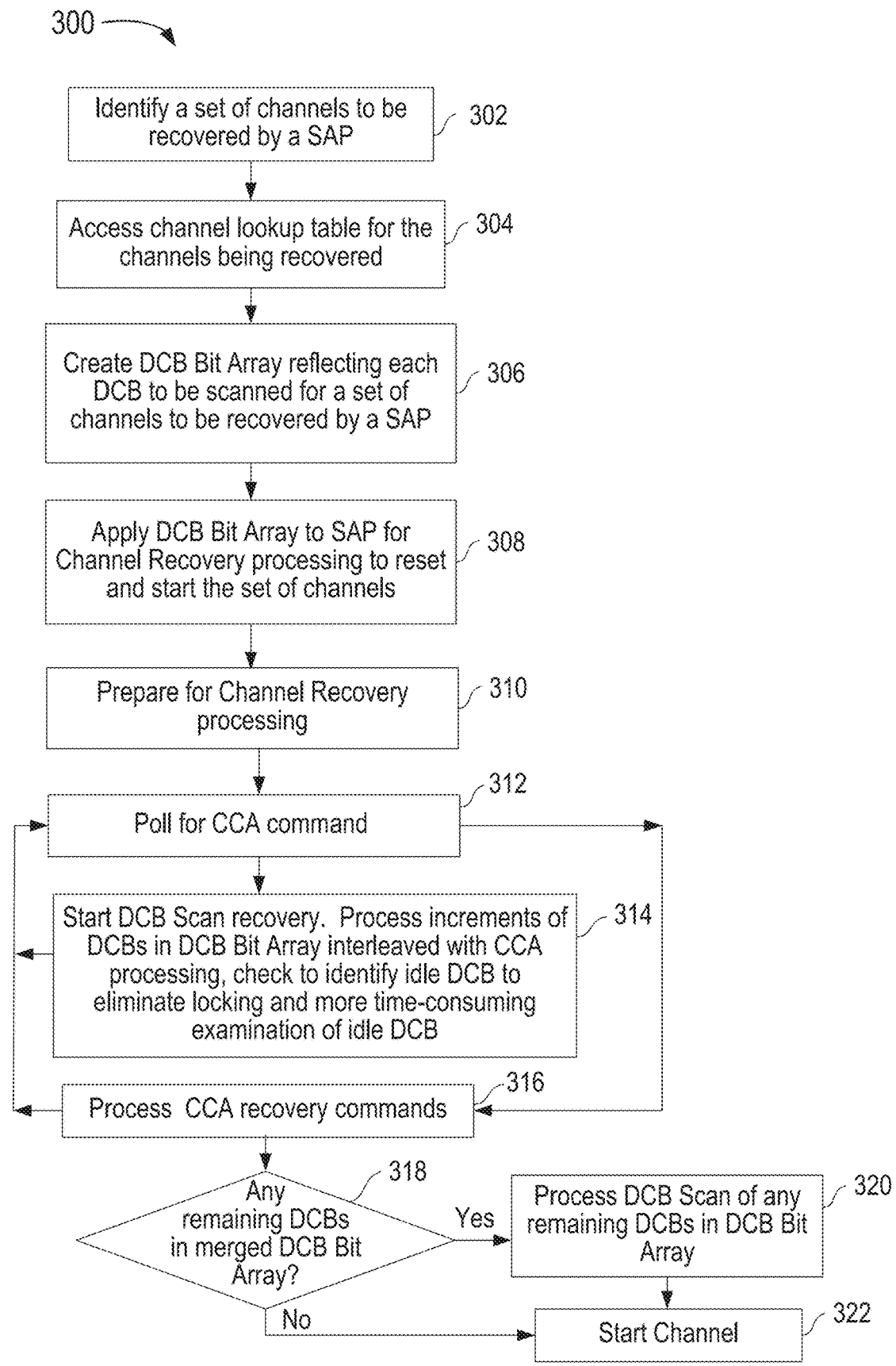
FIG. 3 is a flow chart of an example operations of an example method for implementing channel recovery actions of one or more embodiments of the present disclosure.

FIG. 3 illustrates an example method 300 for implementing channel recovery actions of disclosed embodiments. For example, in a disclosed embodiment, method 300 is implemented by system 200 including the Channel Recovery DCB Scan Control Code 182 and computer 101 in accordance with one or more disclosed embodiments of the present disclosure.

In a disclosed embodiment, system 200 implements the example method 300 aggregating recovery of DCBs 214 by the creation of a single DCB Bit Array 216, where processing of the DCB Bit Array can be done in any size increments and interleaved with asynchronous recoveries. In a disclosed embodiment, system 200 implements enhanced synchronous DCB scan recovery of control blocks by performing a check to determine whether the DCB was not actively being used (i.e., whether the DCB was idle), and thus eliminating the locking of the DCB and more time-consuming examination of the control block.

At block 302, system 200 identifies a set of channels to be recovered by a SAP 206. For example, the set of channels to be recovered by the SAP 206 may include one individual channel 208 or multiple channels 208, each associated with the system assist processor 206. At block 304, system 200 accesses a CHID LUT for each of the set of channels to be recovered. At block 306, system 200 creates a DCB Bit Array reflecting each DCB to be scanned for the set of the channels to be recovered, for example by a respective SAP 206 of multiple SAPs. At block 308, system 200 applies the DCB Bit Array 215 to the SAP 206 for channel recovery processing of the set of channels to reset and start the set of channels.

At block 310, the SAP 206 of system 200 prepares for channel recovery processing, including asynchronous recovery operations and synchronous DCB Scan recovery operations. As shown at block 312, the SAP 206 of system 200 starts asynchronous channel communication area (CCA) recovery processing, issues a poll for a CCA command of a command sequence for channel recovery.

At block 314, the SAP 206 of system 200 starts synchronous DCB scan recovery to sequentially process an incremental portion of the DCB Bit Array 216 interleaved with asynchronous CCA recovery processing. For example, in a disclosed embodiment, the synchronous DCB scan processing of the incremental portion of the DCB Bit Array interleaved with asynchronous CCA recovery processing, is performed during an available empty time space or delay time space of the asynchronous CCA recovery processing at block 314. Further at block 314, the SAP 206 of system 200 checks to identify an idle DCB, and eliminates locking and more time-consuming examination of an identified idle DCB, thus proving enhanced synchronous DCB scan processing.

At block 316, the SAP 206 of system 200 processes CCA asynchronous channel recovery operations to complete the recovery command sequence processing for channel recovery. At decision block 318, the SAP 206 of system 200 checks for any remaining DCBs in the merged DCB Bit Array to be scanned. When remaining DCBs to be scanned are identified, the SAP 206 of system 200 at block 320, processes the remaining DCBs, and starts the channel at block 322. Otherwise, with no remaining DCBs to be scanned, the SAP 206 of system 200 immediately starts the channel at block 322.

Figure 4A:
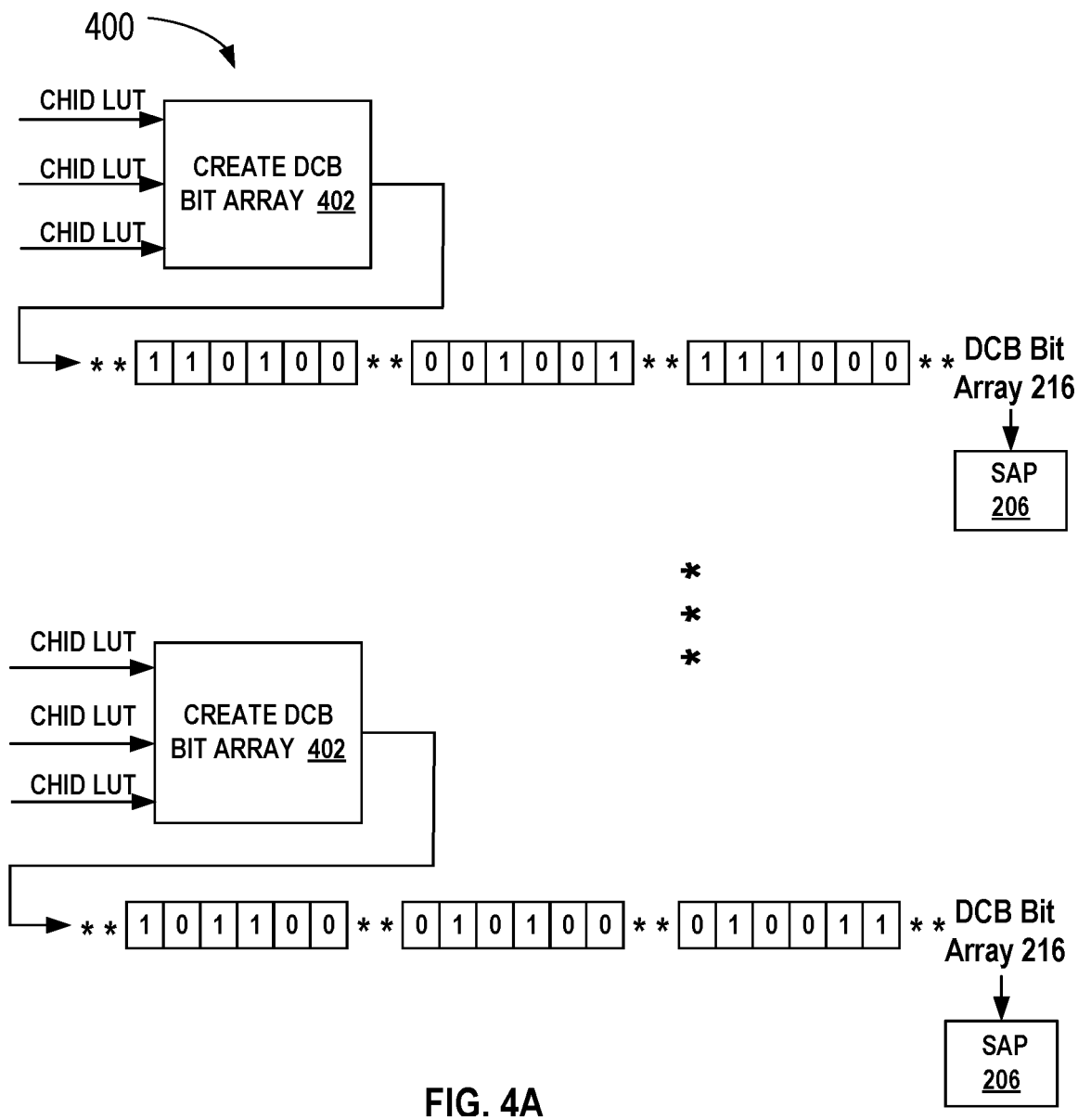

FIG. 4A illustrates example parallel operations 400 for building a respective example DCB Bit Array per SAP of one or more embodiments of the present disclosure. A DCB Bit Array 216 is created for all the DCBs of a set of the channels to be recovered by a specific SAP 206 of the multiple SAPs 1-M 206. As shown, the example parallel operations 400 implement a respective SAP Bit Array 216 for a respective SAP 206 of multiple SAPs to recover the associated set of the channels. In a disclosed embodiment, the example parallel operations 400 of building and applying a respective example DCB Bit Array 216 to a specific SAP 206 and the example operations of method 300 advantageously are processed simultaneously using multiple SAPs 206 for performing multiple concurrent sets of channel recoveries.

As shown at block 402, system 200 creates a DCB Bit Array reflecting all the DCBs to be scanned for a set of channels being recovered by a specific SAP. In a disclosed embodiment, at the beginning of channel recovery, the DCB Bit Array is built using a CHID LUT. System 200 creates the DCB Bit Array 216 at the beginning of channel recovery using each channel's LUT of the set of channels, which are input to block 402. Each bit represents a single DCB 214, and in one embodiment the DCB Bit Array size accounts for all possible DCBs as illustrated and described with respect to FIG. 4B.

Referring to FIG. 4B, an example DCB Bit Array 410 (per SAP 206) includes example elements and sizes (CSSID/SSID/IID/DCB #) of one or more embodiments of the present disclosure. As shown, DCB Bit Array 410 includes <numCSSID*numSSID*numIID*numDCBs #>. For example, numCSSID represents an example number of a channel subsystem identifier, such as numCSSID=6; numSSID represents an example number of a subchannel set identifier, such as numSSID=4; numIID represents an example number of an image identifier, such as numIID=16; and numDCBs #represents an example number of a device control blocks per CSSID/SSID/IID, such as numDCBs #s=64K. Based on the given example elements and sizes, an example size of the illustrated DCB Bit Array 410 per SAP in the HSA is represented by (6*4*16*64K) bits=24 Mb=3 MB. Based on the given example elements and sizes, with for example 64 SAPs 206, an example size of DCB Bit Arrays is represented by (number of SAPs*3 MB)=64*3 MB=192 MB in the HSA 212 of system 200.

Figure 5:
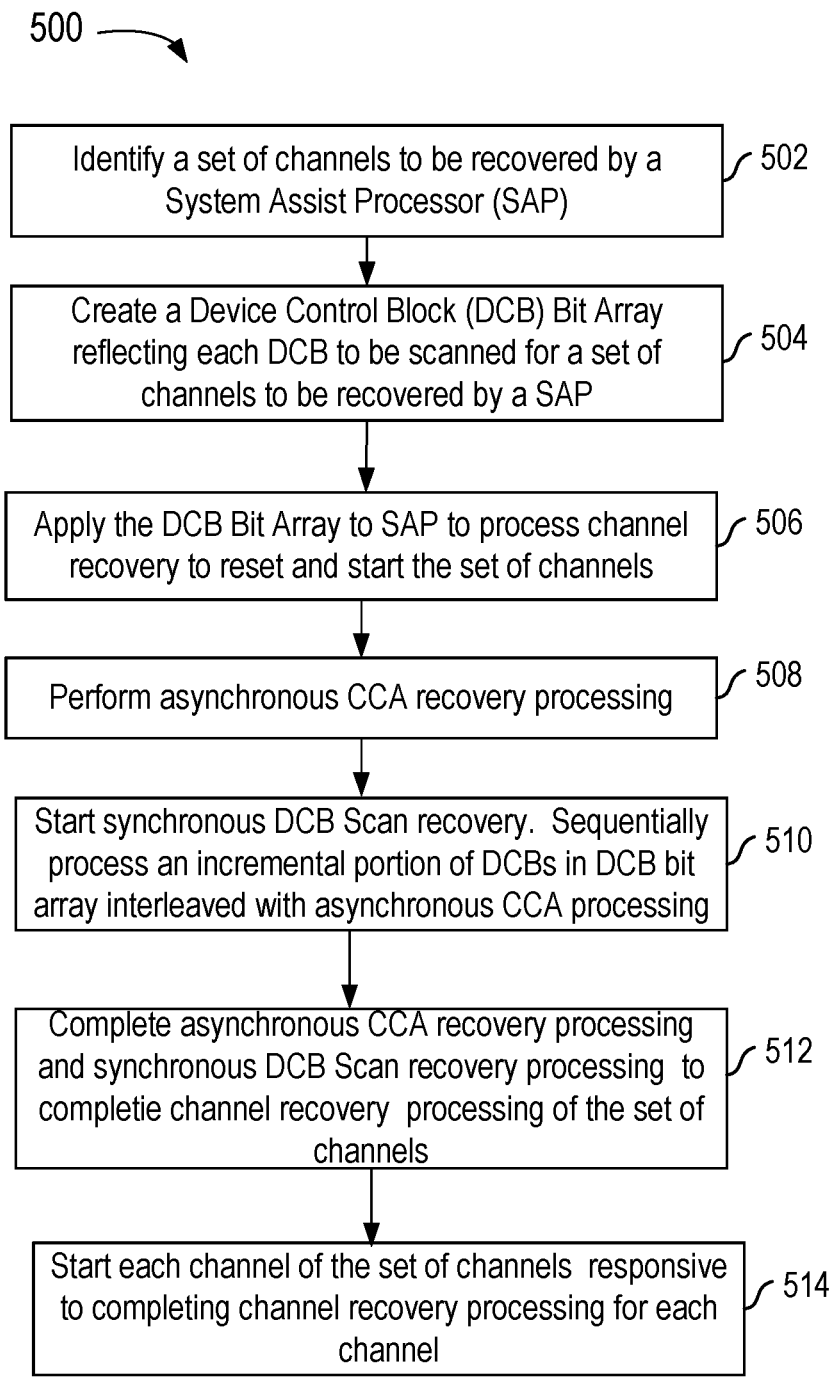
FIG. 5 is a flow chart of an example method for implementing DCB scan recovery for channel recovery actions of one or more embodiments of the present disclosure.

FIG. 5 illustrates an example method 500 for implementing DCB scan for channel recovery operations of one or more embodiments of the present disclosure. The method 500 can be implemented by the system 200 in conjunction with the computer 101 of FIG. 1 with the Channel Recovery DCB Scan Control Code 182 of disclosed embodiments.

At block 502, system 200 identifies a set of channels to be recovered by a SAP, where for example the set of channels can include an individual channel, or multiple subsystem channels 208. At block 504, system 200 creates a DCB Bit Array for all the DCBs of the set of the channels to be recovered by a respective SAP 206 of multiple SAPs. For example, creating the DCB Bit Array uses a respective CHID LUT for each of the set of the channels to be recovered by a SAP 206. At block 506, system 200 applies the DCB Bit Array to the respective SAP to process channel recovery to reset and start the set of channels.

At block 508, system assist processor 206 of system 200 performs asynchronous CCA recovery processing. For example, the SAP 206 prepares for channel recovery processing, issues a poll for a CCA command, and processes a command sequence for the asynchronous CCA recovery processing.

At block 510, SAP of system 200 starts synchronous DCB scan recovery and sequentially processes an incremental portion of the DCB Bit Array interleaved with asynchronous CCA recovery processing. For example, in a disclosed embodiment, the synchronous DCB scan recovery operations include performing a check of the DCB to determine if the Device Control Block is not actively being used (i.e. the DCB is idle) and thus eliminating the locking of the control block and more time-consuming examination of the idle Device Control Block. For example, in a disclosed embodiment, the synchronous DCB scan recovery operations of processing the incremental portion of the DCB Bit Array replace an existing empty time space or delay time space of the asynchronous CCA recovery processing. For example, the DCB scan recovery operations of processing the incremental portion of the DCB Bit Array may include scanning 1000 DCBs of the DCB Bit Array during the asynchronous CCA recovery processing delay time space. At block 512, system assist processor of system 200 completes asynchronous CCA recovery processing and synchronous DCB scan recovery to complete channel recovery processing of the set of channels. At block 514, SAP of system 200 starts each channel of the set of channels responsive to completing channel recovery processing of each channel.

While the foregoing is directed to embodiments of the present invention, other and further embodiments of the invention may be devised without departing from the basic scope thereof, and the scope thereof is determined by the claims that follow.

What is claimed is:

1. A method comprising:
    identifying, by a processor, a set of channels to be recovered that are associated with the processor;
    creating, by the processor, a Device Control Block (DCB) Bit Array comprising a plurality of DCBs for each channel in the set of channels;
    transmitting the DCB Bit Array to the processor to process channel recovery to reset and start the set of the channels;
    issuing, by the processor, a poll for a channel communication area (CCA) command sequence to determine channel recovery actions for recovering the set of channels;
    based on the CCA command sequence, performing, by the processor, synchronous DCB scan recovery by sequentially scanning an incremental portion of the DCB Bit Array to determine a status of the DCBs in the incremental portion of the DCB Bit Array along with modifying, by the processor, the DCBs in the incremental portion based on the channel recovery actions by asynchronous CCA recovery processing to update the DCBs;
    responsive to completing the synchronous DCB scan, implementing, by the processor, any remaining recovery actions for each of the DCBs in the incremental portions of the DCB Bit Array; and
    starting, by the processor, each channel of the set of channels with the updated DCBs.

2. The method of claim 1, wherein a channel subsystem comprises a plurality of processors and wherein identifying the set of channels to be recovered by the processor further comprises for each respective processor of the plurality of processors, identifying an associated set of channels to be recovered.

3. The method of claim 1, wherein a channel subsystem comprises a plurality of processors and further comprises simultaneously using one or more processors to process channel recovery for one or more concurrent sets of channel recoveries.

4. The method of claim 1, wherein creating the DCB Bit Array further comprises using a channel identifier (CHID) lookup table (LUT) for each of the set of channels.

5. The method of claim 1, wherein performing synchronous DCB scan recovery further comprises processing the incremental portion of the DCB Bit Array during a delay time space of the asynchronous CCA recovery processing.

6. The method of claim 1, wherein the status of the DCBs indicates whether a respective DCB is idle, wherein the processor modifies idle DCBs before non-idle DCBs, and wherein the processor locks DCBs that are not idle.

7. The method of claim 1, wherein performing asynchronous CCA recovery processing and performing synchronous DCB scan recovery further comprises performing time slicing operations of the asynchronous CCA recovery processing and the synchronous DCB scan recovery.

8. A system, comprising:
    a processor; and
    a memory, wherein the memory includes a computer program product configured to perform operations for implementing Device Control Block (DCB) scan for channel recovery actions, the operations comprising:
        identifying, by the processor, a set of channels to be recovered that are associated with the processor;
        creating, by the processor, a DCB Bit Array comprising a plurality of DCBs for each channel in the set of channels;
        transmitting the DCB Bit Array to the processor to process channel recovery to reset and start the set of the channels;
        issuing, by the processor, a poll for a channel communication area (CCA) command sequence to determine channel recovery actions for recovering the set of channels;
        based on the CCA command sequence, performing, by the processor, synchronous DCB scan recovery by sequentially scanning an incremental portion of the DCB Bit Array to determine a status of the DCBs in the incremental portion of the DCB Bit Array along with modifying, by the processor, the DCBs in the incremental portion based on the channel recovery actions by asynchronous CCA recovery processing to update the DCBs;
        responsive to completing the synchronous DCB scan, implementing, by the processor, any remaining recovery actions for each of the DCBs in the incremental portions of the DCB Bit Array; and
        starting, by the processor, each channel of the set of channels with the updated DCBs.

9. The system of claim 8, wherein creating the DCB Bit Array further comprises using a channel identifier (CHID) lookup table (LUT) for each of the set of channels.

10. The system of claim 8, wherein performing synchronous DCB scan recovery further comprises processing the incremental portion of the DCB Bit Array during a delay time space of the asynchronous CCA recovery processing.

11. The system of claim 8, wherein the status of the DCBs indicates whether a respective DCB is idle, wherein the processor modifies idle DCBs before non-idle DCBs, and wherein the processor locks DCBs that are not idle.

12. The system of claim 8, wherein performing asynchronous CCA recovery processing and performing synchronous DCB scan recovery further comprises performing time slicing operations of the asynchronous CCA recovery processing and the synchronous DCB scan recovery.

13. A non-transitory computer program product comprising:
    one or more computer-readable storage media; and program instructions stored on the one or more computer-readable storage media to perform operations comprising:
  identifying, by a processor, a set of channels to be recovered that are associated with the processor;
  creating, by the processor, a Device Control Block (DCB) Bit Array comprising a plurality of DCBs for each channel in the set of channels;
  transmitting the DCB Bit Array to the processor to process channel recovery to reset and start the set of the channels;
  issuing, by the processor, a poll for a channel communication area (CCA) command sequence to determine channel recovery actions for recovering the set of channels;
  based on the CCA command sequence, performing, by the processor, synchronous DCB scan recovery by sequentially scanning an incremental portion of the DCB Bit Array to determine a status of the DCBs in the incremental portion of the DCB Bit Array along with modifying, by the processor, the DCBs in the incremental portion based on the channel recovery actions by asynchronous CCA recovery processing to update the DCBs;
  responsive to completing the synchronous DCB scan, implementing, by the processor, any remaining recovery actions for each of the DCBs in the incremental portions of the DCB Bit Array; and
  starting, by the processor, each channel of the set of channels with the updated DCBs.

14. The non-transitory computer program product of claim 13, wherein creating the DCB Bit Array further comprises using a channel identifier (CHID) lookup table (LUT) for each of the set of channels.

15. The non-transitory computer program product of claim 13, wherein performing synchronous DCB scan recovery further comprises processing the incremental portion of the DCB Bit Array during a delay time space of the asynchronous CCA recovery processing.

16. The non-transitory computer program product of claim 13, wherein the status of the DCBs indicates whether a respective DCB is idle, wherein the processor modifies idle DCBs before non-idle DCBs, and wherein the processor locks DCBs that are not idle.

17. The non-transitory computer program product of claim 13, wherein performing asynchronous CCA recovery processing and performing synchronous DCB scan recovery further comprises performing time slicing operations of the asynchronous CCA recovery processing and the synchronous DCB scan recovery.

* * * * *